(12) United States Patent
Ren

(10) Patent No.: US 7,974,480 B2
(45) Date of Patent: *Jul. 5, 2011

(54) UNIVERSAL FIXED-PIXEL-SIZE ISP SCHEME

(75) Inventor: Jau-Wen Ren, Saratoga, CA (US)

(73) Assignee: Mobilic Technology (Cayman) Corp., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/551,406

(22) Filed: Aug. 31, 2009

(65) Prior Publication Data

US 2009/0317009 A1    Dec. 24, 2009

Related U.S. Application Data

(63) Continuation of application No. 11/255,373, filed on Oct. 21, 2005, now Pat. No. 7,602,974.

(51) Int. Cl.
*G06K 9/36* (2006.01)
*G06K 9/46* (2006.01)
*H04N 1/413* (2006.01)
*H04N 1/41* (2006.01)

(52) U.S. Cl. ............... 382/232; 358/426.13; 358/426.14

(58) Field of Classification Search .................. None
See application file for complete search history.

(56) References Cited

U.S. PATENT DOCUMENTS

| | | | |
|---|---|---|---|
| 4,566,038 A | 1/1986 | Dimick | |
| 4,792,981 A | 12/1988 | Cahill et al. | |
| 4,868,557 A * | 9/1989 | Perlman | 345/538 |
| 4,887,162 A | 12/1989 | Arai | |
| 5,138,673 A | 8/1992 | Yoshida et al. | |
| 5,237,646 A | 8/1993 | Bunce | |
| 5,585,863 A | 12/1996 | Hackett et al. | |
| 5,677,689 A | 10/1997 | Yovanof et al. | |
| 5,740,284 A | 4/1998 | Wober et al. | |
| 5,838,831 A | 11/1998 | De Queiroz | |
| 5,848,192 A | 12/1998 | Smith et al. | |
| 6,433,707 B1 | 8/2002 | Crandall | |
| 6,480,631 B2 | 11/2002 | So et al. | |
| 6,608,933 B1 | 8/2003 | Dowell et al. | |
| 6,653,954 B2 | 11/2003 | Rijavec | |
| 6,870,538 B2 | 3/2005 | MacInnis et al. | |
| 7,146,053 B1 | 12/2006 | Rijavec | |
| 2003/0147468 A1 | 8/2003 | Matsumura et al. | |

(Continued)

OTHER PUBLICATIONS

U.S. Appl. No. 11/255,373, filed Oct. 21, 2005.

(Continued)

*Primary Examiner* — Samir A Ahmed
*Assistant Examiner* — Li Liu
(74) *Attorney, Agent, or Firm* — Beyer Law Group LLP

(57) ABSTRACT

An Image Signal Processing unit (ISP) has at least one fixed-size line buffer which is smaller than the width of the image buffer. To handle the image data, the image buffer is divided into regions which are sequentially loaded into the at least one fixed-size line buffer of the ISP for processing. Since functions of the ISP operate with neighboring pixels of the target pixel, margins of the regions need to be transmitted as well. After processing by the ISP, the data is encoded which includes a DCT, Quantization, and VLC. The result is then stored in segments in a buffer storage. VLC also inserts a Restart Marker which is used as a pointer to stitch together all the segments thus producing a new and seamless image.

20 Claims, 4 Drawing Sheets

U.S. PATENT DOCUMENTS

2004/0258322 A1 12/2004 Hong et al.
2005/0122347 A1 6/2005 Buerkle et al.
2005/0253949 A1 11/2005 Maeda

OTHER PUBLICATIONS

U.S. Appl. No. 11/255,374, filed Oct. 21, 2005.
Office Action dated Nov. 12, 2008 from U.S. Appl. No. 11/255,373.
Office Action dated Dec. 8, 2008 from U.S. Appl. No. 11/255,374.
Final Office Action dated Apr. 9, 2009 from U.S. Appl. No. 11/255,374.
Notice of Allowance dated Aug. 24, 2009 from U.S. Appl. No. 11/255,373.

* cited by examiner

UNIVERSAL FIXED-PIXEL-SIZE ISP SCHEME

CROSS REFERENCE TO RELATED APPLICATION

This application is a continuation of co-pending U.S. patent application Ser. No. 11/255,373, filed Oct. 21, 2005 and entitled "UNIVERSAL FIXED-PIXEL-SIZE ISP SCHEME," which is incorporated herein by reference in its entirety and for all purposes.

BACKGROUND

1. Field of the Invention

The invention relates to a scheme of using a fixed-size Image Signal Processing unit in imaging applications, and more particularly to a scheme where the line buffer size is a fraction of the image size of the target sensors, other input devices or sources.

2. Description of the Related Art

Traditionally an ISP (Image Signal Processing unit) needs many line buffers in order to perform the functions like Color Interpolation, zooming/Scaling, etc. The size of the line buffers (and their associated control logic) is typically tailored to the maximum image size of the target sensors. The larger the image is, the bigger the line buffers are and the higher the power consumption and manufacturing cost is. In addition in an ISP of the related art, the maximum image size is limited by the line buffers. These disadvantages severely restrict the desire to offer larger image sizes. To cope with the trend of adapting higher pixel sensors in digital camera applications, a Universal Fixed-Pixel-Size ISP scheme is hereby proposed. This new scheme uses a fixed-size line buffer to handle large images, which usually require large size line buffers in a traditional design. By using this universal ISP scheme there is, theoretically, no limit on the ISP in terms of the maximum image size it can process. Since its native line buffer size is much smaller, this universal ISP scheme has the benefits of smaller die-size, manufacturing cost and lower power consumption.

U.S. Pat. No. 6,870,538 (MacInnis et al) discloses a display engine for processing graphics. The graphics may include multiple graphics layers or windows. The processing elements process two or more graphics layers in parallel to generate blended graphics. This parallelism however differs significantly in nature from the two slice buffers of the invention disclosure. The input (both analog and digital video) for receiving data and the processing elements may be integrated on an IC chip.

U.S. Pat. No. 6,480,631 (So et al.) presents an image processing apparatus for performing rotation, enlargement, reduction, clipping or overlapping processing where each scan line is read fully. The applications are different. The purpose of the proposed invention is to enable a short size ISP to handle large images where a long scan line is divided into many shorter ones.

It should be noted that the above-cited example of the related art does not address the use of fixed-size line buffer for large image sizes of target sensors whereby such fixed-size line buffers are small and have a universal use because there is virtually no maximum limit in the image size that could be processed by such a fixed-size line buffer.

SUMMARY

It is an object of at least one embodiment of the present invention to provide a scheme and a method for an Image Signal Processing unit (ISP) with a fixed-size line buffer, regardless of how much larger the size of the image is.

It is another object of the present invention to allow the ISP to perform function such as color interpolation, color correction, gamma correction, shapeness control, brightness control, contrast control, color effects, color-space conversion, resampling (which includes zooming and scaling), image filtering, and image cropping, using the fixed-size line buffer of the invention.

It is yet another object of the present invention to have low power consumption.

It is still another object of the present invention to reduce cost by reducing the size of the real estate required.

It is a further object of the present invention is to accommodate future increases in the image size of the target sensors, other input devices or sources.

These and many other objects have been achieved by dividing the image data into regions which are sequentially loaded into the fixed-size line buffer of the ISP for processing functions such as color interpolation, zooming and scaling. Since these functions of the ISP operate with neighboring pixels of the target pixel, margins of the regions need to be transmitted as well. After processing by the ISP, JPEG encoding starts which includes a DCT, Quantization, and VLC. Instead of JPEG encoding some other encoding means may be used as well. The result is then stored in segments in a buffer storage. VLC also inserts a Restart Marker which is used as a pointer to stitch together again the all the partitioned segments to produce a new and seamless image. The stitching is done sequentially by a CPU, DMA or any other suitable processing unit from the JPEG compressed code by parsing the Restart Marker.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

Use of the same reference number in different figures indicates similar or like elements.

DETAILED DESCRIPTION

The present invention describes a scheme and a method by which a fixed-size line buffer of an Image Signal Processing unit (ISP) need only be a fraction of the image size of the target sensors or other input devices or sources. This is done by partitioning the image into multiple segments or regions and subsequently loading one scan line of each segment or region into the fixed-size line buffer (the number of fixed-size line buffers may be more than one). In particular, the width of the fixed-size line buffer is smaller than the width of the image buffer.

Figure 1:
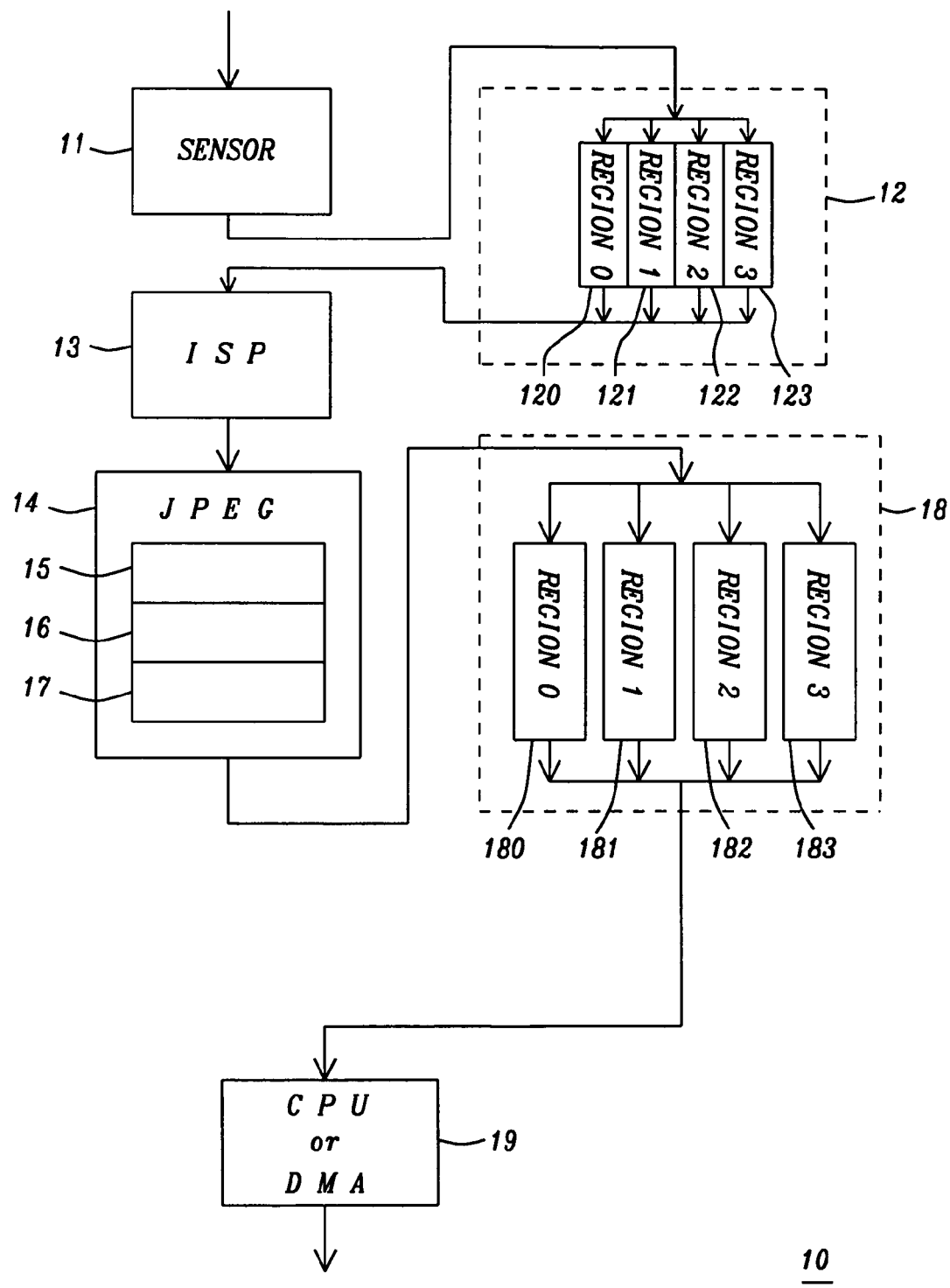
FIG. 1 is a block diagram of a first preferred embodiment of the present invention.

FIG. 1 illustrates in block format the Universal Fixed-Pixel-Size ISP scheme 10 of a first preferred embodiment of the present invention. Block 11 is the sensor which feeds the raw Image Buffer 12, which is a storage means such as a DRAM or an SDRAM or any other suitable storage device. Image Buffer 12 is shown by way of example to have four regions: Region 0 (120), Region 1 (121), Region 2 (122), and Region 3 (123). The image in the Image Buffer 12 is transferred sequentially, region by region into the Image Signal Processing unit (ISP) 13. The Image Signal Processing unit can process exactly one region in a fixed-size line buffer (not shown). A larger image must therefore be subdivided into more regions of a certain width, so that the width of a region can fit into the width of the fixed-size line buffer of the Image Signal Processing unit. In the preferred embodiment of the present invention the fixed-size line buffer is 1-dimensional, thus it can only store one scan line (1D) of a region (2D). The output of ISP 13 feeds JPEG encoder 14 (other encoding methods may be used as well), which typically comprises a discrete cosine transform unit (DCT) 15, a Quantization unit 16, and a Variable Length Coding unit (VLC) 17. DCT 15 may also perform, instead of or in addition to the discrete cosine transform, a wavelet transform or other suitable transform. The output of the JPEG encoder is stored in Main Buffer 18, which comprises four compressed JPEG code regions: Region 0 (180), Region 1 (181), Region 2 (182), and Region 3 (183). The stitching processing in handled by a CPU or DMA engine 19 (depending on the particular implementation of the invention; any other suitable processing units may be used as well) which parses/searches the RSTm markers in order to identify the end of the slice of each region. The RSTm or restart marker will be discussed under the heading RSTm Insertion below. The output of block 19 goes to the output device (not shown) or is stored back to the Main Buffer 18. Image Buffer 12 and Main Buffer 18 may be part of the same memory such as a DRAM, SDRAM or any other such storage device.

To illustrate the concept of the Universal Fixed-Pixel-Size ISP, this invention, by way of example only, chose 640-pixels (VGA i.e. Video Graphics Array) for the line buffer width (the actual width will be slighter more than 640 as will be discussed later on) and a 5M-pixel (2560.times.1920.apprxeq.5 million) sensor. It is obvious to those skilled in the art that other size line buffers and sensors can be used. Prerequisites/assumptions used in this present invention are:

Existence of an Image Buffer 12—to store a full image in Bayer or YUV formats and other applicable formats such as RGB. The Bayer format is a color filter, the smallest unit of which comprises a 2.times.2 square, where 2 green squares are diametrically opposite and where a red and blue square are diametrically opposite; a plurality of such 2.times.2 squares is a Bayer filter.

Partitioning Regions

The data from the sensor 11 is Image data and is transferred from the Image Buffer 12 (typically SDRAM) to ISP 13 during image processing. Since the ISP line buffer width (for example, 640-pixels) in this present example is too small to accommodate the 2560 pixels, the image data must be divided into a multi-region structure were the width of each Region 0-3 (120-123) less than or equal to 640 in the example.

Figure 2:
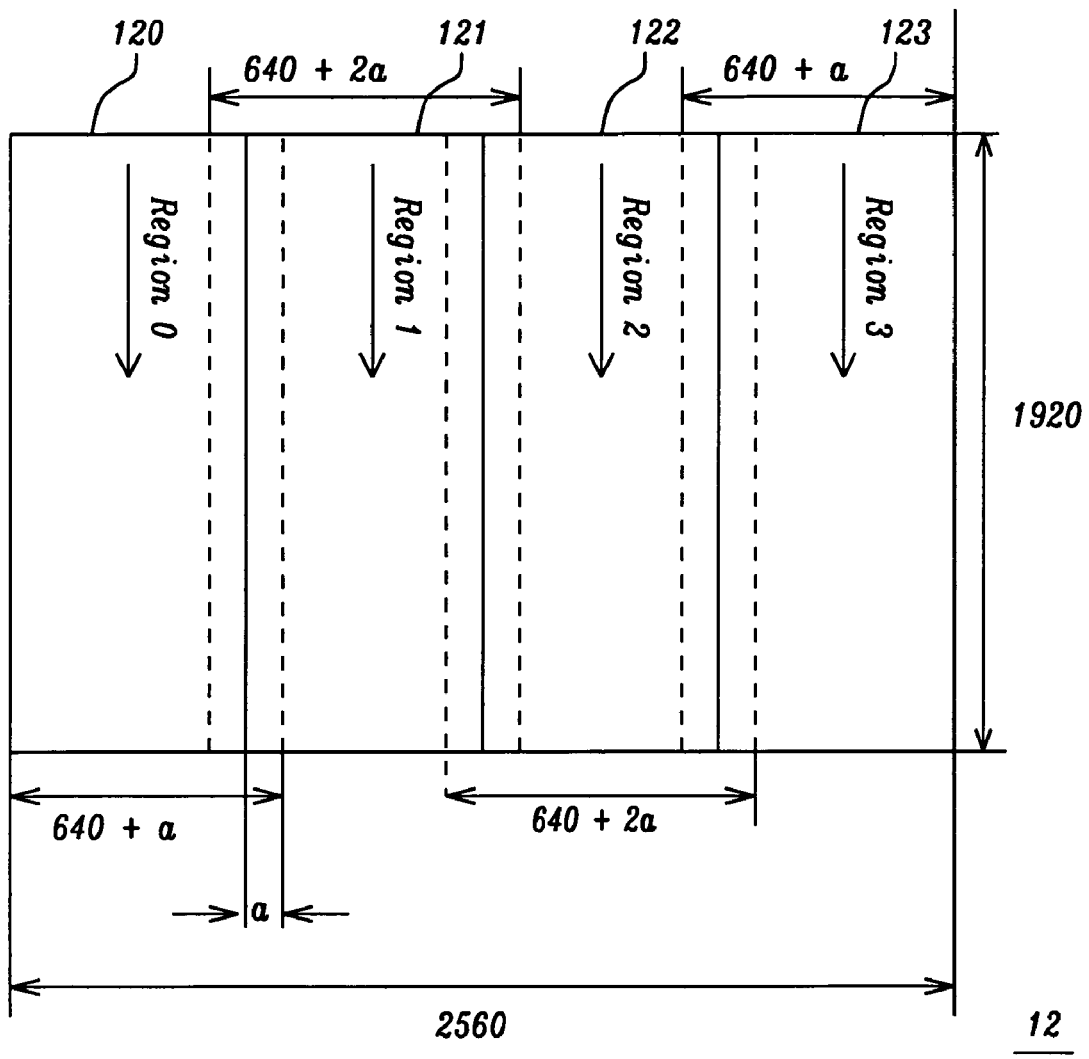
FIG. 2 is a diagram of the image buffer of the present invention.

FIG. 2 shows a more detailed view of the 5M pixel image data Buffer 12 of FIG. 1, divided into four VGA-wide Regions 0-3 (120-123). The image depth is 1920 pixels. Clearly the Image Buffer 12 must have the dimension of 2560.times.1920. The partition is performed when transferring the image data to ISP 13. DMA only moves about 640 pixels instead of a full 2560 pixels for each scan line. After the transfer of one region is done, DMA continues on the next region until the entire image data transfer is completed. Some of the ISP functions operate with neighboring pixels of the target pixel. Which means that additional pixels (represented as a in FIG. 2) located beyond the boundary of the 640-pixel-wide region should be transferred to the ISP as well. The operation starts with the processing of Region 0 (120) as a (640+.alpha.).times.1920 image. The data transferring from SDRAM to the ISP is still in a traditional scan line pattern. Next Region 1 (121), followed by Regions 2 (122) and 3 (123), are processed as either a (640+2.alpha.).times.1920 or (640+a).times.1920 image.

The output of ISP 13 will immediately be loaded to 2 slice buffers (640-pixel wide). This might be in an alternating fashion for example. Once one slice buffer (not shown) is full, the JPEG encoding (14) starts on that slice. Since four regions of image are encoded, four segments of SDRAM space Region 0-3 (180-183) in the Main Buffer 18 are allocated for storing the JPEG bit steams.

Since the 5M image is vertically divided into four regions, and each region is encoded individually, a naive concatenation of 4 JPEG files would not restore a seamless 5M-pixel JPEG image.

RSTm Insertion

To solve this problem we introduce here the Restart Marker (RSTm), which is one of the JPEG makers inserted in the JPEG bit stream for error recovery/resilience purposes. The RSTm can be programmed to be inserted into JPEG bitstream in every fixed-number minimum coding unit (MCU) interval. Where the definition of the MCU is either a group of (2Y blocks+IU+IV blocks) in 422 image format or (4Y blocks+IU+IV blocks) in 420 format. Each block is 8.times.8 pixels. The height of a slice is one MCU, i.e., 8 pixels in 422 image format or 16 pixels in 420 image format The code assignment of RSTm is X'FFD0' to X'FFD7', where 'm' is a modulo-8 number (which loops from 0 to 7). This invention takes advantage of the Restart Marker to perform stitching of the JPEG compressed files from multiple partitioned image regions.

For each 640-pixel wide region, at the end of every slice, an RSTm (m=N) is inserted with the appropriate number of padding bits (1'b1) to make it end at a byte boundary. At the end of the following slice, another RSTm (m=modulo (N+4, 8)) is inserted again, aligned to the byte boundary by padding bits. I.e., the region numbering goes from 0 to 3, while the Restart Marker numbering goes from 0 to 7. In this example of the present invention, the interval of 2 RSTm codes is 40 MCUs in 420 format. The number 40 (the length of a partitioned slice) is derived from 640 (width of a region) divided by 16 (the pixel width of 2Y blocks) for the 420 format. So that 40 is the number which has to be specified in the JPEG file header, for the present example, and set in the variable length code (VLC) section. In general, the number of minimum coding units in each of the slices is determined by the ratio of the pixel width of the slices to the minimum coding unit width.

The reason for ending RSTm at a byte boundary is to make the stitching of four regions of JPEG code easier later on. It is very difficult for either software or hardware to implement bitstream stitching in the non-byte aligned condition. The 'm' value of RSTm has to be carefully arranged so as not to violate JPEG standards once all four regions of JPEG data are stitched together. This is a deterministic pattern of 'm' for every slice of each region. If the CPU (19) does the VLC tasks, the 'm' value calculation can be done by software. This calculation can also be done by the hardware with some programmability.

Figure 3:
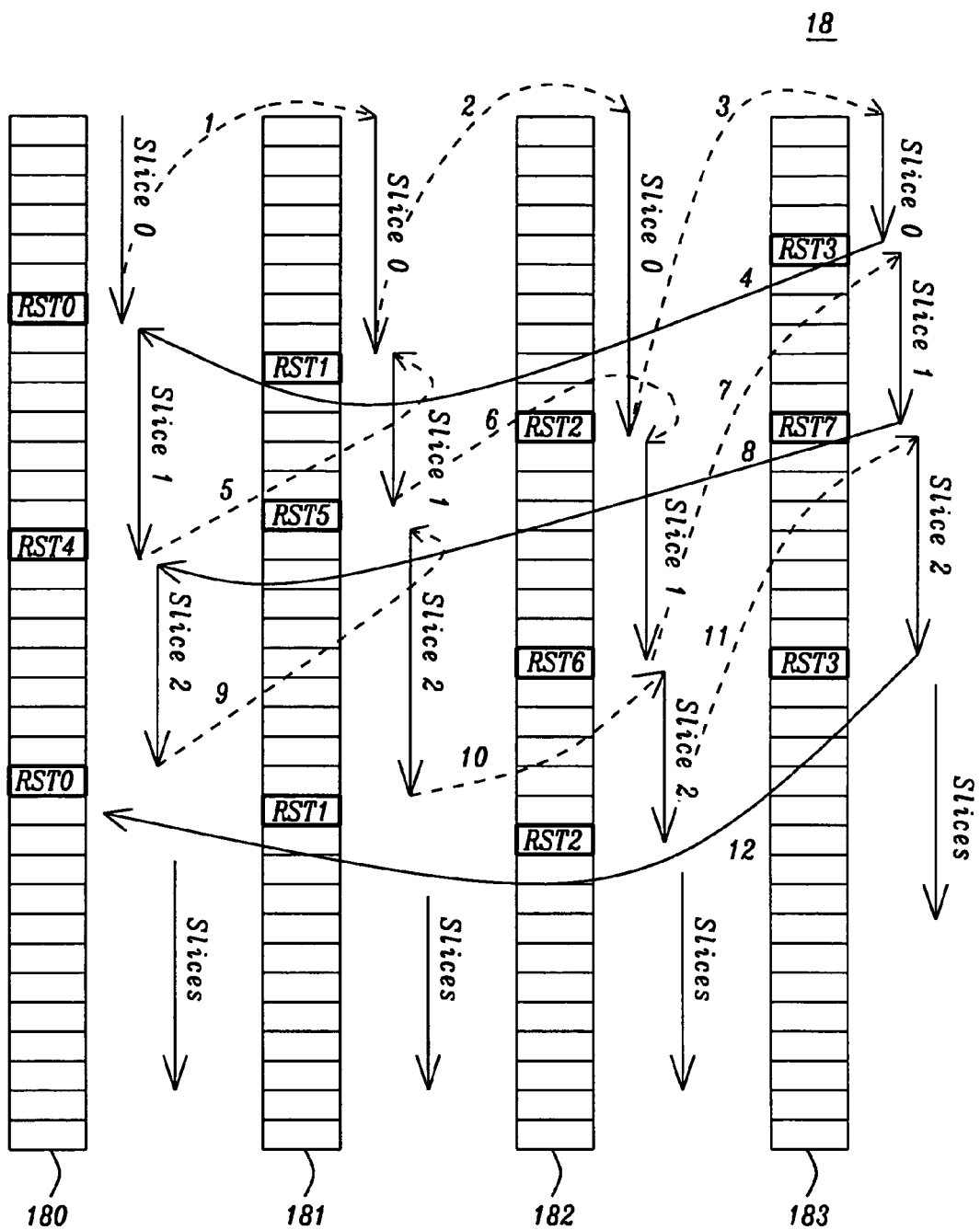
FIG. 3 is a diagram of JPEG code segments in a storage device and of their stitching order.

FIG. 3 illustrates the four segments of JPEG (compressed) data in the Main Buffer 18, starting from slice 0 of each Region 0-3 (180 to 183) and the sequence of code stitching. For every slice, the JPEG code terminates with an RSTm at the byte boundary. For each region Slices 0 to 2 are identified while slices following Slice 2 are only labeled as "slices" since any number of slices could follow. Similarly, for each region Restart Markers are identified as RST0 to RST7, followed by the first four restart markers RST0 to RST3 of the next sequence, as explained above.

Stitching

After the encoding of four regions is done with Regions 0-3 (180-183) of JPEG data in the Main Buffer 18 (SDRAM), proper stitching of these four regions constitutes a single JPEG data. The sequence of stitching is illustrated in FIG. 3 as follows. RST0 of slice 0, Region 0 points to the beginning of slice 0 of Region 1. RST1 of that slice points to the beginning of slice 0, Region 2. RST2 of that slice points to the beginning of slice 0, Region 3. RST3 of that slice points to the beginning of slice 1, Region 0. RST4 of that slice points to the beginning of slice 1 of Region 1. RST5 of that slice points to the beginning of slice 1, Region 2. RST6 of that slice points to the beginning of slice 1, Region 3. RST7 of that slice points to the beginning of slice 2, Region 0. RST0 of that slice points to the beginning of slice 2 of Region 1. RST1 of that slice points to the beginning of slice 2, Region 2. RST2 of that slice points to the beginning of slice 2, Region 3. And RST3 of that slice points to the beginning of the slice after slice 2, Region 0. The arrows showing the stitching of one slice to the next are identified by numerals 1 to 12.

This single JPEG data presents the full 5M-pixel as if it were encoded in one single pass. There are many ways of doing stitching. It can be done either by the CPU 19 with an index table of RSTm locations, or by parsing the JPEG code to determine the existence of an RSTm. Alternative designs, including units such as a smart DMA or any other suitable processing units, can handle the stitching without the CPU's intervention.

Zooming

When the ISP 13 is required to perform zooming, the present Universal ISP Scheme also works. Before image data is transferred to the ISP 13, the CPU 19 has to determine how the image is going to be divided and instruct the DMA, the ISP 13, and the DCT 15 NVLC 17 accordingly. By using the correct width to divide the region, the line buffer (not shown) of the ISP is prevented from overflow when performing zooming. This practice is a general guideline in the present Universal ISP Scheme.

Advantages of the proposed invention are:

a) virtually no maximum limit in image size, b) reduced power consumption over prior art designs, c) perform large image processing in a small fixed-size line buffer, d) economy of scale, since the same fixed-size line buffer can be used in many applications, e) invention is applicable whenever the image size is larger than the ISP buffer size.

Figure 4:
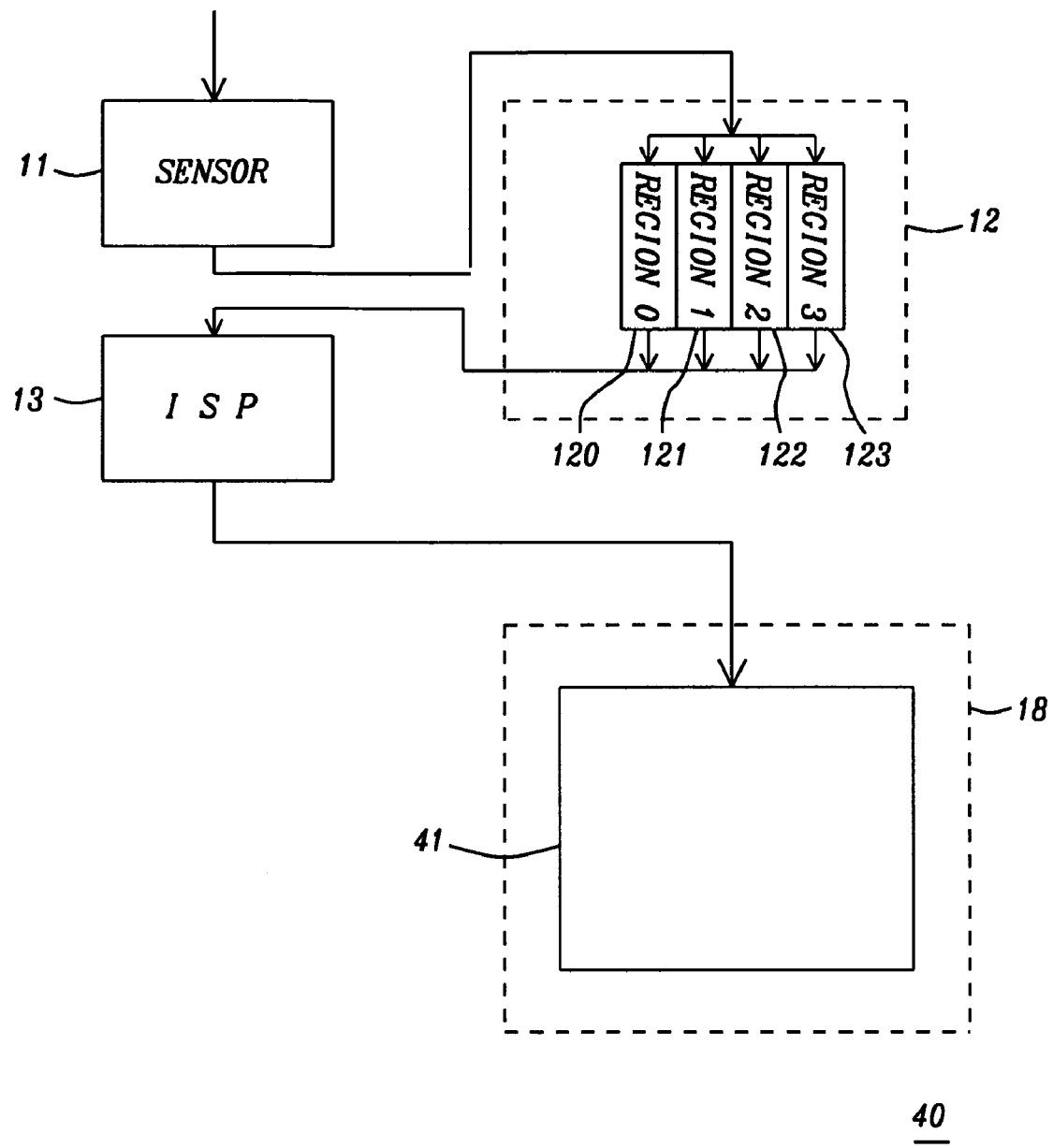
FIG. 4 is a block diagram of a second preferred embodiment of the present invention.

FIG. 4 illustrates in block format the Universal-Pixel-Size ISP scheme 40 of a second preferred embodiment of the present invention. Blocks 11, 12, and 13 are the same as those of FIG. 1 and perform the same function, however the output of ISP 13 is stored in memory 41 of Main Buffer 18. Regions 0 to 3 (120-123) after processing by ISP 13 are stored sequentially in memory 41. The image in memory 41 is an intact and complete representation of the image in Image Buffer 12. Since there is neither compression, DCT, nor VLC there is no need for insertion of a restart marker, stitching or the like. Because the image in memory 41 is not compressed, the storage requirement is larger than that of Regions 0 to 3 (180-183) combined (of FIG. 1). If a large memory is available the second preferred embodiment of the present invention is the better implementation. Otherwise the first preferred embodiment of the present invention is better.

While the invention has been particularly shown and described with reference to the preferred embodiments thereof, it will be understood by those skilled in the art that various changes in form and details may be made without departing from the spirit and scope of the invention.

What is claimed is:

1. A digital image processing system, comprising:
an image signal processing unit adapted to process image data, wherein said image data is partitioned into regions when said image data is transferred by slices into at least one fixed-size line buffer of said image signal processing unit, and wherein each of said slices represents a fixed number of pixels of said image data;
a first storage unit adapted to store image data for processing by said Image Signal Processing unit; and
an encoding component adapted to encode said image data stored in said first storage unit, said encoding component being adapted to insert restart markers into said image data during processing of said slices to allow stitching together of said slices having said encoded image data, wherein said restart markers identify the end of each of said slices, point to the next in-sequence of said slices, contain padding bits to ensure that each of said slices ends on a byte boundary, and are inserted into an image data bitstream at every fixed-number minimum coding unit interval.

2. The system of claim 1, wherein the number of minimum coding units in each of said slices is determined by the ratio of a pixel width of said slices to a minimum coding unit width.

3. The system of claim 1, wherein said image data represents a digital image from a target sensor or other input device.

4. The system of claim 3, wherein said target sensor or other input device comprises a camera.

5. The system of claim 1, further including
a second storage unit adapted to store said encoded image data in segments of said second storage unit; and
a downstream processing unit adapted to stitch together said encoded image data into a complete image, by using said restart markers.

6. The system of claim 1, wherein said fixed-size line buffer stores one scan line of one of said regions of said image data.

7. The system of claim 1, wherein said encoding component utilizes a discrete cosine transform or a wavelet transform of said image data.

8. The system of claim 1, wherein said encoding component utilizes quantization of said image data.

9. The system of claim 1, wherein said encoding component further comprises:
JPEG encoding;
a discrete cosine transform unit for converting data from the time domain to the frequency domain; and
a quantization unit for dividing the coefficient of said discrete cosine transform by a quantization value.

10. The system of claim 9, wherein said minimum coding unit consists of two Y blocks, one U and one V block in the 422 format or of four Y blocks, one U and one V block in the 420 format.

11. A method of using a universal fixed-size line buffer to process a digital image, comprising the steps of:
a) transferring subsets of a digital image from an image buffer to at least one fixed-size line buffer, wherein said at least one fixed-size line buffer has a line size that is shorter than a corresponding line size of said digital image;

b) inserting a restart marker into each of said subsets, wherein said restart marker identifies the end of each of said subsets, points to the next in-sequence of said subsets, contains padding bits to ensure that each of said subsets ends on a byte boundary, and is inserted into an image data bitstream at every fixed-number minimum coding unit interval; and c) stitching together said subsets to form a single image through the use of said inserted restart markers.

12. The method of claim 11, wherein the number of minimum coding units in each of said subsets is determined by the ratio of a pixel width of said subsets to a minimum coding unit width.

13. The method of claim 11, wherein said at least one fixed-size line buffer holds no more than one of said subsets.

14. The method of claim 11, wherein neighboring pixels beyond the boundary of each of said subsets are transferred as well.

15. The method of claim 11, wherein each of said restart markers is assigned a value in a modulo deterministic pattern that depends upon the relative widths of the entire image and the fixed-size line buffer.

16. An image processing device, comprising:
    an image processor adapted to process image data by transferring slices of said image data into at least one fixed-size line buffer, wherein each of said slices represents a fixed number of pixels of said image data; and
    an encoding component adapted to insert restart markers into said image data to allow the subsequent stitching together of said slices having encoded image data, wherein said restart markers identify the end of each of said slices, point to the next in-sequence of said slices, contain padding bits to ensure that each of said slices ends on a byte boundary, and are inserted into the image data bitstream at every fixed-number minimum coding unit interval.

17. The image processing device of claim 16, wherein the number of minimum coding units in each of said slices is determined by the ratio of a pixel width of said slices to a minimum coding unit width.

18. The image processing device of claim 16, further comprising:
    a downstream processing unit adapted to stitch together said encoded image data into the entire image by using said restart markers.

19. The image processing device of claim 16, wherein said image data represents a digital image from a target sensor or other input device.

20. The image processing device of claim 16, wherein each of said restart markers is assigned a value in a modulo deterministic pattern that depends upon the relative widths of an entire image represented by said image data and the fixed-size line buffer.

* * * * *